United States Patent [19]
Rapp

[11] 3,811,193
[45] May 21, 1974

[54] TUBE RADIUS MEASURING METHOD AND DEVICE

[75] Inventor: Willard Emanuel Rapp, Franklin Township, Somerset County, N.J.

[73] Assignee: Western Electric Company, Incorporated, New York, N.Y.

[22] Filed: Apr. 21, 1972

[21] Appl. No.: 246,209

[52] U.S. Cl............................ 33/178 R, 242/46.3
[51] Int. Cl....................... G01b 5/12, G01b 19/72
[58] Field of Search.......... 33/178 R, 178 E, 174 R, 33/174 Q; 242/46.4, 46.3, 68.3

[56] References Cited
UNITED STATES PATENTS

| | | | |
|---|---|---|---|
| 2,930,134 | 3/1960 | Bishop et al. | 33/178 |
| 3,216,121 | 11/1965 | Eisele | 33/178 |
| 3,316,650 | 5/1967 | Aldeborgh et al. | 33/178 |
| 3,296,707 | 1/1967 | Eisele | 33/178 |
| 2,720,033 | 10/1955 | Eisele | 33/178 |
| 2,746,689 | 5/1956 | Berkepeis | 242/46.3 |

Primary Examiner—John W. Huckert
Assistant Examiner—Milton S. Gerstein
Attorney, Agent, or Firm—E. W. Pfeifle; A. S. Rosen

[57] ABSTRACT

A new gauge provides a direct reading of the radial distance between the axis of a tube and a point of interest on the inner wall of the tube. A first position indicator member, in the form of a probe carrier, is centered within the tube by an exertion of spring forces of substantially equal spring constant radially outwardly from the probe carrier against the inner wall of the tube at a number of positions spaced angularly about the axis of the tube. A balancing of reaction forces, thus, locates the probe carrier coaxially with the tube. Meanwhile, a reference point on a second member, in the form of a probe supported by the probe carrier, is contacted with the point of interest on the inner wall of the tube. An electrical signal, having a voltage proportional to the displacement of the reference point on the probe from the axis of the probe carrier, is generated, the signal voltage thereby indicating the radial dimension of interest.

19 Claims, 1 Drawing Figure

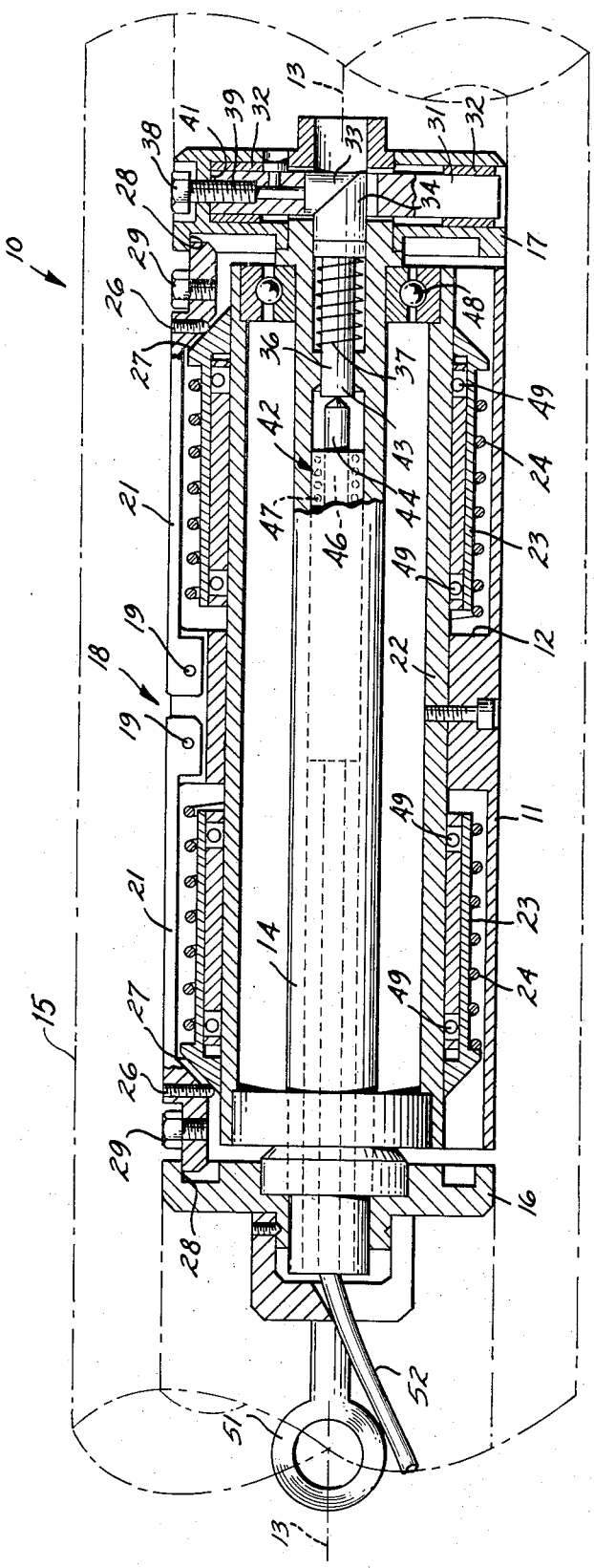

TUBE RADIUS MEASURING METHOD AND DEVICE

BACKGROUND OF THE INVENTION

This invention relates to methods and apparatus for measuring an interior dimension of a tube and, more particularly, to methods and apparatus for measuring the radial distance from the axis of a tube to a point of interest on the inner wall of the tube.

In the art of manufacturing and testing certain types of tubing, such as waveguide tubes to be employed in a system for transmitting communications signals of millimeter wavelength, it is necessary to determine quite precisely a number of internal dimensional characteristics of tube sections undergoing processing. Several devices have been designed for performing such internal measurements, e.g., those disclosed in copending applications Ser. No. 246,210 of W. M. Gresho on Methods and Compound Gauge Devices for Measuring the Axial Curvature of a Tube, and Ser. No. 246,372 of W. E. Rapp on Compound Gauge Devices for Measuring the Axial Curvature of a Tube, both filed on the same date as this application.

It is not possible, however, to utilize devices presently available to determine very precisely and reliably the radial distance from the axis of a tube to a point of interest on the inner wall of the tube. Those devices which are employed in performing tubing measurements in a radial direction are particularly designed to measure the diameter, rather than the radius of the tube. The diameter has always been the dimension of greatest interest, the radius, whenever considered, being taken as simply one-half of the diameter. This, however, presupposes an interior symmetry, e.g., that of a perfect right circular cylinder, which may not be present in a tube. A minor, non-symmetrical deformity may occasion a significantly altered diameter reading even though the radius at an opposite side of the tube from the deformity remains substantially or totally unaffected. Thus, neither the true radius of the tube nor the exact peripheral location of a deformity is indicated by the diameter measurement alone.

It is now considered desirable that radial, rather than diametric, dimensions of a tube be known with precision, particularly in the area of millimeter waveguide manufacture. Methods and devices for measuring the radial distance from the axis of a tube to a point of interest on the inner wall of a tube, so as to indicate precisely the location and magnitude of deformations in the inner wall, are, therefore, of particular interest.

SUMMARY OF THE INVENTION

An object of the invention resides in new and improved methods and apparatus for measuring an internal dimension of a tube, namely the radial distance from the axis of the tube to a point of interest on the inner wall of the tube.

The invention contemplates the centering of a probe carrier device or gauge within the tube such that the axes of the gauge and the tube coincide. Centering may be accomplished by an exertion of radially outwardly directed spring forces of substantially equal spring constant from the gauge against the inner wall of the tube at a plurality of locations spaced angularly about the axis of the tube, such that reaction forces locate the gauge coaxially with the tube.

Once the gauge has been centered within the tube, a probe mounted on the gauge is caused to contact a point of interest on the inner wall of the tube, and the distance between the axis of the gauge and the tip of the probe is determined. Measurement may be aided by the use of a position-responsive, electrical signal generator unit, located along the axis of the gauge and coupled mechanically to the probe.

Provision is also preferably made of facilities for moving the gauge both axially relative to the tube and rotationally relative to the tube so as to contact selectively one or more prospective test points at various locations on the inner wall of the tube.

BRIEF DESCRIPTION OF THE DRAWING

The single FIGURE of the drawing is a side elevational view, partly in section, illustrating a device for measuring the radial distance from the axis of a tube to a point of interest on the inner wall of the tube in accordance with the principles of the invention.

DETAILED DESCRIPTION

Referring to the drawing, a probe carrier device or gauge 10 includes an outer sleeve 11 with an inwardly facing, centrally located, annular rib 12. The outer sleeve has a central axis 13 and is of an outer diameter slightly less than the inner diameter of a tube 15 which is to be measured. A central shaft 14 passes coaxially through the outer sleeve. A pair of end caps 16 and 17 are fixed on the shaft 14, one at each end of the gauge 10.

A number of slots 18, for example, three, are located at equiangular spacings about the periphery of the outer sleeve 11. Each slot extends axially along the full length of the outer sleeve and radially entirely through the outer sleeve and through a substantial portion of the annular rib 12. A pair of pins 19, 19 span each slotted portion of the annular rib. Each pin 19 serves as a pivot point for a different one of two centering arms 21, 21 extending axially in opposite directions from the pins 19, 19 within each slot 18.

An inner sleeve 22, coaxial with the outer sleeve 11 and the central shaft 14, is fixed to the outer sleeve along the inner periphery of the annular rib 12. Two intermediate sleeves 23, 23 are mounted for coaxial sliding movement along the outer periphery of the inner sleeve 22, one toward each end of the inner sleeve from the annular rib. Two coil springs 24, 24 one associated with each of the intermediate sleeves 23, 23, bias the intermediate sleeves axially toward the ends of the inner sleeve 22.

An end of each intermediate sleeve remote from the annular rib 12 is beveled about its entire outer peripheral edge, for example, at an acute angle of about forty-five degrees to the axis of the sleeve. Alternatively, a different bevel angle, or even a suitably curved camming surface, may be utilized. Each centering arm 21 includes an adjustment screw 26 positioned near the outer end of the centering arm so as to engage the beveled portion 27 of the adjacent intermediate sleeve.

Each end cap 16 and 17 includes an axially extending, circumferentially running shoulder 28. The shoulders are positioned so as to engage an axially outward tip of each centering arm 21. The shoulders 28, 28 limit the degree to which the centering arms can pivot radially outwardly under an outward camming effect of the beveled portions 27, 27 of the spring-biased intermediate sleeves 23, 23 on the adjustment screws 26, 26. During measuring operations, however, with the gauge 10 housed within a tube 15, the bias of the springs 24, 24 will force a set of radially adjustable feed 29, 29, one foot located adjacent to the axially outward tip of each centering arm, outwardly into contact with an inner wall of the tube 15, with the centering arm tips not quite engaging the shoulders 28, 28. The feet 29, 29 may be formed of hardened steel.

The spring constants of the two coil springs 24, 24 are identical. Since the geometry of the gauge 10 is generally symmetrical, once the gauge is housed within the tube 15, each foot 29 will tend to bear against the inner wall of the tube 15 with a force equal to that exerted by all of the other, equiangularly arrayed sets of feet 29, 29 in the slots 18. A balanced set of reaction forces, therefore, will be exerted by the inner wall against the feet 29, 29 on the centering arms 21, 21, maintaining the gauge 10 centered within the tube 15, the axis 13 of the gauge coinciding with the axis of the tube.

A probe 31 is mounted for radial movement within a pair of sleeves 32, 32 fitted into end cap 17. The probe has a central aperture within which a cam follower 33 is fitted. The cam follower is mounted on the probe 31 to move radially with the probe, and is beveled at an angle of forty-five degrees to the axis 13 of the gauge. An end portion 34 of a push rod 36 is also beveled at an angle of 45° so as to mate precisely with the bevel on the cam follower, as shown in the drawing.

The push rod 36 is housed within the central shaft 14 for longitudinal movement along the axis 13 of the gauge 10. A spring 37 surrounds the push rod and biases the push rod toward the beveled cam follower 33. As a result, the bevel on the end portion 34 of the push rod tends to cam the cam follower 33, and with it the probe 31, radially outwardly. Thus, when the gauge is housed within a tube 15, a radially outermost tip 38 of the probe will be urged into continuous contact with the inner wall of the tube 15. The tip 28 is radially adjustable with respect to the beveled cam follower 33 on the probe 31, due to the use of a threaded stud 39 on an outer end of which the tip 38 is located. A stop surface 41 is provided by a radially inwardly facing portion of end cap 17. The stop surface acts to limit outward movement of the probe and, thus, retain the probe within the sleeve 32 while the gauge 10 is not housed within a tube.

A conventional, linear variable differential transformer (LVDT) 42 is mounted on the axis 13 of the gauge 10 adjacent to an end portion 43 of the push rod 36 remote from the beveled end portion 34. A conventional LVDT, as disclosed for example in U.S. Pat. No. 2,427,866 issued to W. D. Macgeorge, generally comprises a primary coil, two identical secondary coils interconnected with each other and symmetrically spaced from the primary coil, and a non-contacting movable magnetic core. Motion of the core varies the mutual inductance between each secondary coil and the primary coil to produce an electrical output signal proportional to the displacement of the core. An actuator 44 is joined to a core 46 which is movable axially within a coil 47 of the LVDT 42. A spring (not shown) located within the LVDT biases the actuator 44 along the axis 13 so as to maintain the actuator in continuous engagement with the adjacent end portion 43 of the push rod. Thus, the longitudinal position of the push rod 36, which indicates with precision the radial position of the tip 38 of the probe 31, is continuously sensed by the LVDT.

The inner sleeve 22 of the guage is mounted on precision bearings 48 (only one shown) for relative rotation about the axis 13 with respect to the central shaft 14. Such relative rotation will, of course, be shared by the outer sleeve 11, inasmuch as the inner and outer sleeves are fixed together. Additionally, the intermediate sleeves 23, 23 are mounted on bearings 49, 49 for free axial movement along the inner sleeve 22.

In the operation of the gauge 10, the threaded stud 39 is first adjusted such that, when the gauge is housed within a tube 15 of known nominal diameter which is to be examined, the probe tip 38 will continuously engage the inner wall of the tube 15 with the stop surface 41 ineffective to limit radially outward movement of the tip even in the vicinity of any reasonably expectable outward deformity in the inner wall. The adjustment screws 26, 26 and the feet 29, 29 are also fixed preliminarily so as to assure centering of the gauge within the tube. The gauge is then placed into one end of the tube 15 to be measured.

With the centering arms 21, 21 pivoted radially inwardly from the shoulders 28, 28, the centering arms are urged outwardly under the camming effect of the beveled portions 27, 27 of the spring-biased intermediate sleeves 23, 23 on the adjustment screws 26, 26. The sets of feet 29, 29 in the equiangularly arrayed slots 18 bear against the inner wall of the tube 15, while a balancing of the reaction forces from the inner wall against the feet centers the gauge 10 within the tube 15 such that the axis 13 of the gauge coincides with that of the tube 15.

The tip 38 of the probe 31, meanwhile, contacts the inner wall of the tube 15. The force exerted by the tip 38 on the inner wall is substantially less than that exerted by the feet 29, 29, due to the use of a relatively very small spring 37 to bias the beveled push rod 36, as compared with the springs 24, 24. Thus, the continuous contact of the probe tip with the inner wall has substantially no effect upon the centering of the gauge within the tube 15 through the balancing of reaction forces on the equiangularly arrayed sets of feet 29, 29.

A pull ring 51 located on an end of the gauge 10 may be utilized, for example, with a suitable draw wire or chain, to position the gauge at any desired longitudinal location within the tube 15 being measured. Alternatively, where practicable, the tube 15 might be displaced axially with the gauge held in fixed position.

Relative rotation of the tube 15 with respect to the probe 31, in order to orbit the tip 38 relatively about the axis 13 of the tube, is also possible. For example, the tube 15 may be rotated about its axis while the central shaft 14 of the gauge and the probe 31 are held fixed against rotation. The outer sleeve 11, the intermediate sleeves 23, 23, and the inner sleeve 22 will rotate with the tube 15 on the bearings 48, the feet 29, 29 continuously engaging the inner wall of the tube 15 and centering the gauge within the tube.

Combined relative longitudinal and rotary movements of the probe with respect to the inner wall of the tube are, thus, permitted. It is possible, therefore, to position the tip of the probe in contact with any given point on the inner wall of the tube 15 and measure the radial distance from the axis of the tube 15 to the given point. The measurement is provided by an electrical voltage signal from the LVDT 42, which signal may be transmitted along a wire or cable 52 to an external indicator of conventional type, such as a voltmeter. A series of axial passes through the tube 15, at different relative angular positions of the probe within the tube 15, or a single axial pass with relative rotation of the tube 15 at each of a number of different longitudinal positions of the probe within the tube, may be utilized to characterize the inner wall of the tube over a relatively large number of sampling points on the inner wall.

It is to be understood that the above-described device is simply illustrative of one device which may be utilized in accordance with the principles taught above in carrying out the method of the invention. Numerous modifications may be made or alternative devices provided for carrying out such method. Briefly stated, the method of the invention involves the utilization of a pair of position indicator members in measuring the radial distance from the axis of a tube 15 to a point of interest on the inner wall of the tube. For example, in the depicted embodiment, the LVDT 42, the actuator 44, the push rod 36, the central shaft 14 and the various sleeves 11, 22, 23, and the centering arms 21, 21 may constitute a first position indicator member. The probe 31 may form a second position indicator member. The first position indicator member is centered within the tube 15 by the exertion of radially outward spring forces of substantially equal spring constant from the first position indicator member against the inner wall of the tube 15 at a number of positions spaced angularly about the axis of the tube, a balancing of reaction forces acting to locate the first position indicator member along the axis of the tube. Meanwhile, a reference point on the second position indicator member, e.g., the tip 38 of the illustrated probe 31, is contacted with the point of interest on the inner wall of the tube 15, and the distance between the reference point on the second position indicator member and the center of the first position indicator member is determined, as by the electrical voltage signal from the LVDT. Relative movement between the reference point on the second position indicator member and the inner wall of the tube 15, in an axial and/or orbital direction, in order to examine various points of interest on the inner wall of the tube, is also contemplated in performance of the method of the invention.

What is claimed is:

1. A device for measuring radial distance from the longitudinal axis of a tube to points of interest on the inner wall of the tube, the device comprising:
   a probe carrier having a longitudinal axis and adapted to be inserted within said tube;
   first means comprising a plurality of radially movable means equiangularly spaced about said longitudinal axis of the probe carrier and actuable together for automatically centering the probe carrier within the tube so that the longitudinal axis of the probe carrier is coincident with the longitudinal axis of the tube;
   a probe reciprocably mounted on the probe carrier for movement normal to the longitudinal axis thereof and extending radially outwardly therefrom, the probe having a tip adapted to engage the inner wall of the tube at a point of interest; and
   second means for indicating the radial distance between the tip of the probe and the longitudinal axis of the probe carrier, thereby to measure the radial distance from the longitudinal axis of the tube to the point of interest.

2. In a device as set forth in claim 1:
   the probe carrier further comprising third means for biasing the probe radially outwardly to contact the tip of the probe continuously with the inner wall of the tube during measurement of said radial distance.

3. In a device as set forth in claim 1: third means for displacing the probe axially relative to the tube to contact the tip of the probe with one or more points of interest at various longitudinal positions along the inner wall of the tube.

4. In a device as set forth in in claim 1:
   third means to rotate the probe carrier relative to both the tube and said first means about the longitudinal axis of the tube thereby to selectively position the probe to contact the tip of the probe with a point of interest on the inner wall of the tube at various angular positions about the longitudinal axis of the tube.

5. In a device as set forth in claim 4:
   fourth means for displacing the probe axially relative to the tube to contact the tip of the probe with one or more points of interest at various longitudinal positions along the inner wall of the tube.

6. In a device as set forth in claim 1, said first means comprising:
   an elongated member mounted for movement axially of the probe carrier and having a longitudinal axis coincident with the longitudinal axis of the probe carrier, an outer surface of the elongated member having camming surface areas extending radially inwardly toward a first end of the elongated member along at least a plurality of locations spaced angularly about the axis of the probe carrier;
   third means for biasing the elongated member in a biasing direction from a second and opposite end of the elongated member toward said first end; and a plurality of force-transmitting elements mounted in longitudinal alignment with said camming surface areas of the elongated member and spaced angularly about the axis of the probe carrier at positions adjacent to said locations, each force-transmitting element including a cam-riding area on its inner surface for engaging a different one of said elongated member camming surface areas such that each element is cammed radially outwardly with respect to the axis of the probe carrier by radial forces from the camming surface areas of the elongated member in said biasing direction to contact the inner wall of the tube, a balancing of the reaction forces from the inner wall of the tube through the force-transmitting elements acting to center the probe carrier coaxially within the tube.

7. In a device as set forth in claim 6:
   the first means further comprising fourth means, including a plurality of pins, for mounting said force-transmitting elements to pivot radially outwardly upon the exertion on the force-transmitting elements of radial forces from the camming surface areas of the elongated member.

8. In a device as set forth in claim 6:
   the probe carrier further comprising fourth means for biasing the probe radially outwardly to contact the tip of the probe continuously with the inner wall of the tube during the measurement of said radial distance;

the force exerted on the probe by said fourth means in a radially outward direction having a magnitude substantially less than the forces exerted on the force-transmitting elements by the camming surface areas of the elongated member in a radially outward direction, said magnitude being insufficient to affect substantially said centering of the probe carrier within the tube.

9. In a device as set forth in claim 2, said second means comprising:

a 45° beveled surface along a radially inwardly facing portion of said probe; and fourth means, mounted for movement axially of said probe carrier and including an elongated member extending axially of the probe carrier with a radially extending end of the elongated member having a surface beveled at a forty-five degree angle oriented to engage the beveled surface on the probe along a plane of contact, for indicating the linear position of the elongated member along the axis of the probe carrier.

10. In a device as set forth in claim 9, said second means further comprising:

fifth means for biasing the elongated member in a direction toward the probe to press the beveled surface on the elongated member against the beveled surface on the probe such that the probe is cammed radially outwardly to contact the tip of the probe with the point of interest on the inner wall of the tube.

11. In a device as set forth in claim 10, said first means comprising:

an additional elongated member mounted for movement axially of the probe carrier and having a longitudinal axis coincident with the longitudinal axis of the probe carrier, an outer surface of the additional elongated member having camming surface areas extending radially inwardly toward a first end of the elongated member along at least a plurality of locations spaced angularly about the axis of the probe carrier;

additional means for biasing the additional elongated member in a biasing direction from a second and opposite end of the additional elongated member toward said first end; and a plurality of force-transmitting elements mounted in longitudinal alignment with said camming surface areas of the additional elongated member and spaced angularly about the axis of the probe carrier at positions adjacent to said locations, each force-transmitting element including a cam-riding area on its inner surface for engaging a different one of said additional elongated member camming surface areas such that each element is cammed radially outwardly with respect to the axis of the probe carrier by radial forces from the camming surface areas of the additional elongated member in said biasing direction to contact the inner wall of the tube, a balancing of the reaction forces from the inner wall of the tube through the force-transmitting elements acting to center the probe carrier within the tube;

said additional means for biasing exerting through the force-transmitting elements forces substantially greater than the force exerted by the biasing means associated with the probe such that the centering of the probe carrier within the tube is substantially unaffected by the camming of the probe into contact with the inner wall of the tube.

12. A method of employing first and second position indicator members to measure the radial distance from the longitudinal axis of a tube to a point of interest on the inner wall of the tube, the method comprising the steps of:

automatically centering said first member within the tube by exerting radially outward spring forces of substantially equal spring constant from the first member against the inner wall of the tube at a plurality of positions spaced angularly about the axis of the tube, such that a balancing of reaction forces locates the first member coaxially with the longitudinal axis of the tube; while contacting a reference point on said second member with the point of interest on the inner wall of the tube; and determining the distance between said reference point on the second member and the center of the first member.

13. In the method of claim 12, said step of determining the distance between the reference point on the second member and the center of the first member comprising:

generating an electrical signal having a voltage proportional to the instantaneous value of said distance.

14. In the method of claim 12, the further step of:

displacing the reference point on the second member relative to the inner wall of the tube in order to measure the radial distance from the axis of the tube to various points of interest on the inner wall of the tube.

15. In the method of claim 14, said displacing step comprising:

orbiting the reference point on the second member about the axis of the tube relative to the inner wall of the tube.

16. In the method of claim 14, said displacing step comprising:

moving the reference point on the second member axially relative to the tube.

17. In the method of claim 14, said displacing step comprising:

moving the reference point on the second member relative to the inner wall of the tube both axially and orbitally about the axis of the tube.

18. A method of measuring the radial distance from the longitudinal axis of a tube to a point of interest on the inner wall of the tube, the method comprising the steps of:

automatically centering a first position indicator member within the tube by exerting radially outward spring forces of substantially equal spring constant from the first member against the inner wall of the tube at a plurality of positions spaced equiangularly about the longitudinal axis of the tube, such that a balancing of reaction forces locates the center of the first member coaxially within the tube; while contacting a reference point on a second position indicator member with the point of interest on the inner wall of the tube; and determining the distance between said reference point on the second member and the center of the first member.

19. In the method of claim 18, said step of determining the distance between the reference point on the second member and the center of the first member comprising:

generating an electrical signal having a voltage proportional to the instantaneous value of said distance.

* * * * *